United States Patent [19]

Moyes et al.

[11] 4,358,277
[45] Nov. 9, 1982

[54] METHOD AND APPARATUS FOR CONDUCTING AN OPINION SURVEY

[75] Inventors: William C. Moyes, San Luis Obispo; Russell W. Gerber, Palo Alto; Richard Ehrbar, Los Osos, all of Calif.

[73] Assignee: Sunbelt Communications, Ltd., Menlo Park, Calif.

[21] Appl. No.: 277,820

[22] Filed: Jun. 26, 1981
(Under 37 CFR 1.47)

[51] Int. Cl.$^3$ .............................................. G09B 7/00
[52] U.S. Cl. .................................................. 434/322
[58] Field of Search ............... 434/319, 320, 322, 350, 434/355, 363

[56] References Cited

U.S. PATENT DOCUMENTS

| | | | |
|---|---|---|---|
| 2,612,431 | 9/1952 | Galloway | 346/33 R |
| 3,136,567 | 6/1964 | Smith | 282/25 |
| 3,222,597 | 12/1965 | Beatenbough et al. | 434/319 X |
| 3,708,891 | 1/1973 | Rosov | 434/321 |
| 3,747,228 | 7/1973 | Yamamoto | 434/320 |
| 3,800,439 | 4/1974 | Sokolski et al. | 434/355 |
| 3,805,412 | 4/1974 | Lambright et al. | 434/321 |
| 3,900,961 | 8/1975 | Sokolski et al. | 434/363 |
| 3,943,641 | 3/1976 | Dworetzky | 434/350 |

Primary Examiner—William H. Grieb
Attorney, Agent, or Firm—Majestic, Gallagher, Parsons & Siebert

[57] ABSTRACT

A survey apparatus for indicating the qualitative perceptions of a selected sampling base to commercially broadcasted, popular compositions is disclosed. Familiar portions of a plurality of such compositions are recorded sequentially at equal volume and playing time to each other on a survey medium. Each familiar portion is preceded by a fade-in and followed by a fade-out defining a segment. Each segment is preceded by a verbal indicia. The survey medium is played to members of the sampling base to record their qualitative perceptions on an optoelectronically readable score sheet.

6 Claims, 3 Drawing Figures

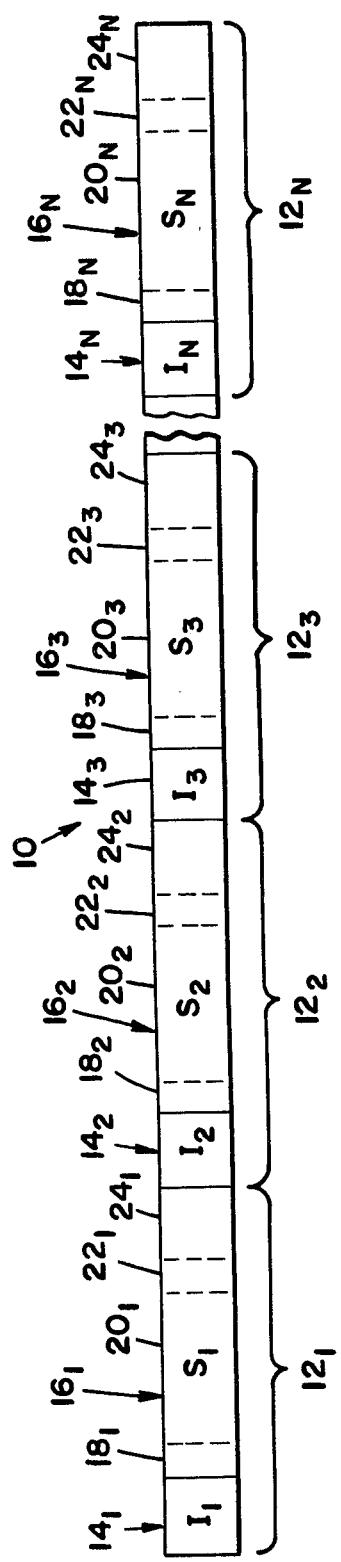
FIG_1
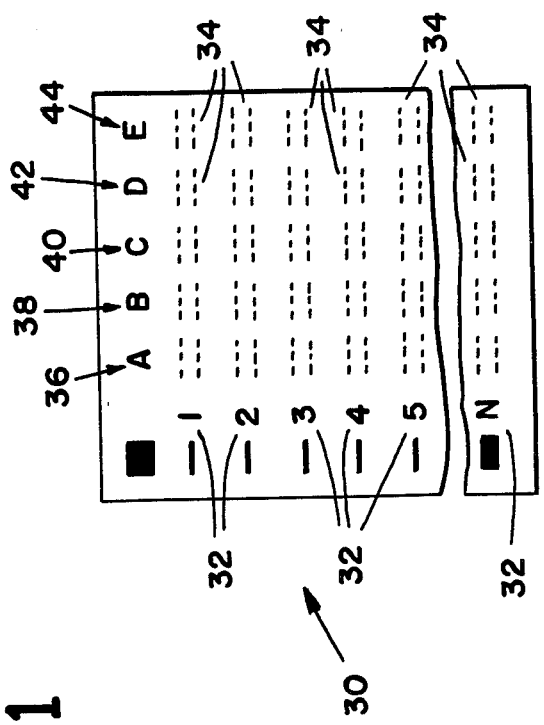
FIG_3
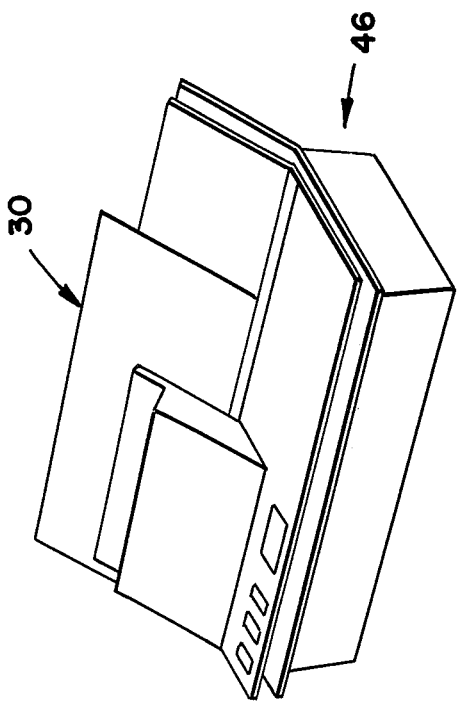
FIG_2

METHOD AND APPARATUS FOR CONDUCTING AN OPINION SURVEY

DESCRIPTION

1. Field of the Invention

The present invention relates generally to opinion surveying and more particularly to a method and apparatus for indicating a qualitative perception of a selected sampling base to commercially broadcasted compositions.

2. Background Art

Opinion surveys are taken for a variety of well known purposes. Examples of such purposes range from programming on television to taste-test samplings to political moods of voters. Surveys may be conducted by telephone contact to a selected sampling base of the general public or by random interviews. It is known to carefully choose a selected sampling base for minimizing errors in the survey.

An example of an audience response system is disclosed by Dworetzky, U.S. Pat. No. 3,943,641, issued Mar. 16, 1976. Each member of the audience is provided with a two position toggle switch for indicating a favorable or unfavorable reaction to an event, such as portions of a lecture or a direct question. The response is displayed on a console having meters for recording time of unfavorable responses and a percentage of unfavorable responses out of all responses at a given moment. The Dworetzky audience response system is primarily useful for continuous monitoring of the reaction of an audience to a lecture, especially in an educational institution. By not providing for any controls over the selection of the audience, any reaction to an event developed by the response system may not be applied to a broad base general opinion survey.

It is also desirable to automatically tally the responses of the selected sampling base. A newspaper balloting method is disclosed by Smith, U.S. Pat. No. 3,136,567, issued June 9, 1964. As disclosed therein, reader reaction to newspaper articles is voted by marking indicia on each of the newspapers. The marking is transferred by appropriate ink media to a detachable post card for automatic machine tallying.

An apparatus for tallying responses is disclosed by Galloway, U.S. Pat. No. 2,612,431, issued Sept. 30, 1952. The disclosed survey recorder has a screen which sequentially displays a plurality of questions with answer indicia. The person being interviewed moves a pointer to the desired indicia. The recorder records the reply on a concealed record tape having associated indicia with the viewing indicia. When the survey is completed the record tape is removed for tallying the responses.

However, it also becomes necessary to exercise detailed controls over the survey process to develop consistent results which upon analyzing such results may be useful for marketing of commercial broadcasts.

SUMMARY OF THE INVENTION

According to the present invention, a prerecorded survey medium is presented to a selected sampling base in human responsive form. The survey medium includes a plurality of sequential bits, each of the bits having an indicia portion and a segment portion and being recorded at a substantially equal volume and playing time to each other. Each segment portion includes a familiar portion of a popular composition. The members of the sampling base indicate the qualitative perceptions of the familiar portion of the composition on an optoelectronically readable score sheet.

BRIEF DESCRIPTION OF THE DRAWINGS

FIG. 1 is a diagrammatic representation illustrating an embodiment of a survey medium according to the principles of the present invention;

FIG. 2 illustrates a general format for an electronically readable score sheet; and FIG. 3 is a perspective view of a machine for reading the score sheet of FIG. 2.

DETAILED DESCRIPTION OF THE DRAWINGS

In order to obtain an accurate opinion survey of a plurality of commercially broadcasted popular compositions through human sensory reactions, it is necessary to record and analyze responses from a selected sampling base. The sampling base is selected from a plurality of interviewees, and the selection made on the basis of responses of the interviewees to a selected set of interrogatories. The interrogatories are directed to at least age, sex, type of programming preferred as offered by commercial broadcast media, and an average month of time per calendar unit the interviewee turns in to the broadcast media. An example of such a set of interrogatories is attached hereto as appendix A and made a part hereof.

Referring now to FIG. 1, there is shown a representation of a prerecorded survey medium 10 for presentation to the selected sampling base in human responsive form. As an example, survey medium 10 may be ferromagnetic recording tape. Survey medium 10 includes a plurality of sequential bits 12, the reference numeral identifying each bit 12 being subscripted indicating a sequential order and modification of each bit 12 from each other bit 12.

Each bit 12 has an indicia (I) portion 14 and a segment (S) portion 16 and is prerecorded at a substantially equal volume and playing time to each other of bits 12.

Each segment portion 16 includes fade-in portion 18, a familiar portion 20 of a popular composition, a fade-out portion 22 and a blank portion 24. Fade-in portion 18 is disposed immediately prior to familiar portion 20. Fade-out portion 22 is disposed immediately following familiar portion 20. Blank portion 24 is disposed immediately following fade-out portion 22.

In one embodiment of the present invention, indicia portion 14 may include a verbal command indicia, such as 1, 2, 3, et. seq., corresponding to $I_1$, $I_2$, $I_3$, et. seq., respectively. Indicia portion 14 may have a playing length of one second. Fade-in portion 18 has a playing length of one second and leads into seven seconds playing length of familiar portion 20. Familiar portion 20, by way of example, may be a very familiar part of a well known song such as its opening line or title line. At the conclusion of familiar portion 20, the composition is faded out as represented by fade-out portion 22. Fade-out portion 22 may have a playing length equal to that of fade-in portion 18. Blank portion 24 may include two seconds of silence.

The prerecorded survey medium 10 may have a total playing length of approximately 90 minutes allowing a sequence of 450 sequential bits 12.

Referring now to FIG. 2, there is shown an optoelectronically readable score sheet 30. Score sheet 30 includes a plurality of answer locations 32 shown as rows 1, 2, 3, et. seq., each answer location 32 being associated with a different one of each of bits 12. Each answer location has a plurality of response indicia 34. Each response indicia 34 when marked by a member of the sampling base is indicative of such member's qualitative perception of familiar portion 20 included in each segment 16 of bit 12 associated with each answer location 32.

Each response indicia 34 includes a first response marking area 36, a second response marking area 38, a third response marking area 40, a fourth response marking area 42, and a fifth response marking area 44 shown as columns A, B, C, D and E.

A member of the sampling base would mark first response marking area 36 to indicate a highly positive qualitative perception to familiar portion 20. Second response marking area 38 indicates a slightly positive qualitative perception to familiar portion 20 when marked. Similarly, third response marking area 40 and fourth response marking area 42, when marked by a member of the sampling base, indicate a highly negative qualitative perception and a slightly negative qualitative perception, respectively, to familiar portion 20. The member of the sampling base will mark fifth response marking area 44 to indicate nonfamiliarity with familiar portion 20.

Turning now to FIG. 3, there is shown an optical reader 46 for reading score sheet 30, and for tallying the totality of marks made in each response marking area 36 through 44. Optical reader 46 has been fully described in U.S. Pat. No. 3,800,439 (Sokolski), issued Apr. 2, 1974, such disclosure being incorporated herein by reference and made a part hereof as if fully set forth at this point. Answer sheet 30 has beendisclosed in U.S. Pat. No. 3,900,961 (Sokolski), issued Aug. 26, 1975, such disclosure being incorporated herein by reference and made a part hereof as if set forth fully at this point.

There has been described novel apparatus and techniques for conducting a musical survey. Although the present invention has been described with reference to a particular embodiment thereof, those still in the art may now make numerous uses of and modifications to the present invention without departing from the inventive concepts disclosed herein. The present invention is to be limited only by the spirit and scope of the appended claims.

APPENDIX A

INTERROGATORIES PROPOUNDED TO INTERVIEWEES

1. On the typical weekday, how many hours do you usually spend listening to music on the radio?

INTERVIEWER:
If less than 2 hours - (DISCONTINUE)
If 2 hours or more - (PROCEED)
2. Do you listen some almost every day to an AM radio station?
    1 Yes
    2 No - (DISCONTINUE)
3. Does anyone in your household work for a radio station, television station, newspaper or advertising agency?
    1 Yes
    2 No - (DISCONTINUE)
4. As I read a list of age groups, please stop me when I mention the group which includes your age:
    1 UNDER 12 - (DISCONTINUE)
    2 12-17
    3 18-24
    4 25-34

APPENDIX A-continued

INTERROGATORIES PROPOUNDED TO INTERVIEWEES

5 AND OVER - (DISCONTINUE)
5. Sex (Record without asking)
    1 Male
    2 Female
6. Have you participated in any group meetings or discussions wherein your opinions were solicited within the last six months?
    1 Yes - (THANK AND DISCONTINUE)
    2 No
7. I'm going to describe two different types of radio stations by the kind of music they play. Listen to each description, then please tell me if you listen to this type of station OFTEN, JUST ONCE IN A WHILE, or ALMOST NEVER. Okay? That's OFTEN, JUST ONCE IN A WHILE, or ALMOST NEVER.
A. Station A plays music by such artists as Billy Joel, Fleetwood Mac, Paul McCartney and the Doobie Brothers.
    1 Ofter
    2 Once in a while
    3 Almost never
B. Station B plays music by such artists as Neil Diamond, Barbra Streisand, Barry Manilow and Diana Ross.
    1 Often
    2 Once in a while
    3 Almost never
INTERVIEWER:
1. If respondent says "often" to either A or B above, skip to Question 9.
2. If respondent says "often" to both A and B go on to Question 8.
3. If respondent does not respond "often" to either A or B above, then THANK AND DISCONTINUE.
8. Now, which of the two types of radio stations - A or B - would you say you listen to most? Just stop me as I go through the descriptions again for stations A and B, and when I pick the type that describes which station you listen to most often.
INTERVIEWER:
REPEAT descriptions in Questions 6, describing Stations A and B.
    1 Station A
    2 Station B
9. We would like to have your help in learning about music listening in _____. Your opinions will be very helpful and we would like to be able to talk to you a little more so that we can improve the music that you hear on the radio in _____. We will be conducting a group meeting, during which short segments of several songs will be played for you, and which we would like you to listen to. It will take about two hours of your time, and we'd be glad to give you a cash gift for your participation. Would you help us by attending the meeting?
    1 Yes
    2 No

We claim:
1. In the art of opinion surveying a plurality of commercially broadcasted popular compositions through human sensory reactions for recording and analyzing responses from a selected sampling base, the sampling base being selected from a plurality of interviewees, the selection being made on the basis of responses of the interviewees to a selected set of interrogatories, the interrogatories being directed to at least age, sex, type of programming preferred as offered by commercial broadcast media, and an average length of time in which said interviewee turns to said commercial broadcast media, a survey apparatus comprising:
    a prerecorded survey medium for presentation to said selected sampling base in human responsive form, said medium including a plurality of sequential bits, each of said bits having an indicia portion and a segment portion and being prerecorded at a substantially volume and playing time to each other of said bits, each segment portion including a familiar portion of a different one of each of said compositions; and an optoelectronically readable score sheet distributed to each member of said selected sampling base, said score sheet including a plurality of answer locations, each of said answer locations having a plurality of response indicia and being associated with a different one of said bits, each response indicia when marked by said member being indicative of said member's qualitative perception of said familiar portion included in said segment of said bit associated with said answer locations.

2. A survey apparatus as set forth in claim 1 wherein each segment portion further includes a fade-in portion disposed immediately prior to said familiar portion, a fade-out portion disposed immediately following said familiar portion, and a blank portion disposed immediately following said fade-out portion.

3. A survey apparatus as set forth in claim 2 wherein said familiar portion has a playing length greater than the playing length of said fade-in portion and said fade-out portion.

4. A survey apparatus as set forth in claim 1 wherein said plurality of response indicia of each of said answer locations includes a first response marking area for indicating a highly positive qualitative perception, a second response marking area for indicating a slightly positive qualitative perception, a third response marking area indicating a highly negative qualitative perception, a fourth response marking area for indicating a slightly negative qualitative perception, and a fifth response marking area for indicating unfamiliarity with said familiar portion.

5. In the art of opinion surveying a plurality of commercially broadcasted popular compositions through human sensory reactions for recording and analyzing responses thereto, a method comprising:

selecting a sampling base from a plurality of interviewees, said selecting made on the basis of responses of said interviewees to a selected set of interrogatories, said interrogatories being directed to at least age, sex, type of programming preferred as offered by commercial broadcast media, and average length of time tuned to said commercial broadcast media;

selecting a familiar portion from each of said popular compositions;

preparing a survey medium from each selected familiar portion, said medium including a plurality of bits each of said bits having an indicia portion and a segment portion and being recorded at substantially equal lengths of time and playing time to each other of said bits, said segment portion including at least said familiar portion;

providing an optoelectronic readable score sheet for each member of said sampling base, said score sheet including a plurality of answer locations, each answer location being associated with the different one of said bits indicating a qualitative perception of each member to said familiar portion.

6. A method as set forth in claim 5 wherein said providing step further includes providing in each answer location a plurality of response indicia, each of said response indicia including a first response marking area for indicating a highly positive qualitative perception, a second response marking area for indicating a slightly positive qualitative perception, a third response marking area for indicating a highly negative qualitative perception, a fourth response marking area for indicating a slightly negative qualitative perception, and a fifth response marking area for indicating nonfamiliarity with said familiar portion.

* * * * *